(12) United States Patent
Arena

(10) Patent No.: US 9,008,314 B2
(45) Date of Patent: Apr. 14, 2015

(54) SECURE WIRELESS COMMUNICATIONS

(75) Inventor: Scott D. Arena, Peabody, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 852 days.

(21) Appl. No.: 12/272,932

(22) Filed: Nov. 18, 2008

(65) Prior Publication Data

US 2010/0124332 A1    May 20, 2010

(51) Int. Cl.
| | | |
|---|---|---|
| *H04L 9/00* | (2006.01) | |
| *H04K 1/00* | (2006.01) | |
| *G06F 15/16* | (2006.01) | |
| *H04W 12/02* | (2009.01) | |
| *H04L 29/06* | (2006.01) | |
| *H04L 9/14* | (2006.01) | |
| *H04K 1/10* | (2006.01) | |
| *H04K 1/04* | (2006.01) | |
| *H04W 12/00* | (2009.01) | |
| *H04W 74/00* | (2009.01) | |
| *H04W 4/00* | (2009.01) | |
| *H04L 9/32* | (2006.01) | |
| *H04K 1/02* | (2006.01) | |
| *H04W 84/12* | (2009.01) | |

(52) U.S. Cl.
CPC ............... *H04W 12/02* (2013.01); *H04K 1/10* (2013.01); *H04K 1/04* (2013.01); *H04W 12/00* (2013.01); *H04W 74/00* (2013.01); *H04K 1/00* (2013.01); *H04W 4/00* (2013.01); *H04L 9/3215* (2013.01); *H04K 1/02* (2013.01); *H04K 1/003* (2013.01); *H04L 63/0457* (2013.01); *H04L 63/0478* (2013.01); *H04L 63/166* (2013.01); *H04L 63/18* (2013.01); *H04W 84/12* (2013.01); *H04L 9/14* (2013.01); *H04L 9/3226* (2013.01); *H04L 2209/80* (2013.01)

(58) Field of Classification Search
CPC ............. H04K 1/00; H04K 1/02; H04K 1/10; H04K 1/003; H04K 1/04; H04L 9/3215; H04L 63/18; H04W 4/00; H04W 12/00; H04W 74/00
USPC ...................... 380/270, 255, 268, 42; 709/231
See application file for complete search history.

(56) References Cited

U.S. PATENT DOCUMENTS

| | | | | |
|---|---|---|---|---|
| 4,802,220 | A | * | 1/1989 | Marker, Jr. ...................... 380/33 |
| 5,502,767 | A | * | 3/1996 | Sasuta et al. ................... 380/274 |
| 7,406,069 | B2 | * | 7/2008 | Yashar et al. .................. 370/338 |
| 7,505,596 | B2 | * | 3/2009 | Duplessis et al. ............. 380/270 |
| 7,990,904 | B2 | * | 8/2011 | Proctor et al. ................. 370/315 |
| 2002/0112152 | A1 | | 8/2002 | VanHeyningen |
| 2004/0053601 | A1 | * | 3/2004 | Frank et al. .................... 455/411 |

(Continued)

FOREIGN PATENT DOCUMENTS

WO    WO-2005/088893    9/2005

*Primary Examiner* — Azizul Choudhury

(57) ABSTRACT

A system includes a sending access point and a receiving access point. The sending access point divides a data stream into sets of packets, encrypts a first set of packets using a first encryption protocol, encrypts a second set of packets using a second encryption protocol, where the second encryption protocol is different from the first encryption protocol, transmits, using a first channel over a wireless network, the first set of packets, and transmits, using a second channel over the wireless network, the second set of packets. The receiving access point receives the first set of packets and the second set of packets, decrypts the first set of packets using the first encryption protocol, and decrypts the second set of packets using the second encryption protocol.

24 Claims, 7 Drawing Sheets

(56) References Cited

U.S. PATENT DOCUMENTS

| | | | |
|---|---|---|---|
| 2004/0090924 A1* | 5/2004 | Giaimo et al. | 370/252 |
| 2005/0036622 A1* | 2/2005 | Hay et al. | 380/270 |
| 2005/0073964 A1* | 4/2005 | Schmidt et al. | 370/260 |
| 2007/0043940 A1 | 2/2007 | Gustave et al. | |
| 2007/0060104 A1 | 3/2007 | Marathe et al. | |
| 2007/0237327 A1 | 10/2007 | Taylor et al. | |
| 2007/0255947 A1* | 11/2007 | Choudhury et al. | 713/161 |
| 2008/0043686 A1* | 2/2008 | Sperti et al. | 370/338 |
| 2008/0141360 A1* | 6/2008 | Hicks et al. | 726/15 |
| 2009/0042513 A1* | 2/2009 | Woosnam | 455/68 |
| 2009/0180429 A1* | 7/2009 | Stevens et al. | 370/329 |
| 2010/0325421 A1* | 12/2010 | Park et al. | 713/153 |

* cited by examiner

SECURE WIRELESS COMMUNICATIONS

BACKGROUND INFORMATION

Wireless Local Area Networks (WLANs) may provide an extension of a wired network or standard local area network (LAN). Current wireless networks may use standard methods of transmission and data rates, such as Institute of Electrical and Electronics Engineers (IEEE) 802.11a/b/g standards operating over the unregulated 2.4 and 5 GHz frequency spectrums. Other wireless networks may use another standard, such as IEEE 802.11n, that is being developed to incorporate multiple-input/multiple-output (MIMO) technology to improve throughput. Each of these methods relies on Wired Equivalent Privacy (WEP) or Wi-Fi Protected Access (WPA) security protocols with single streams of data transmission. Wireless data may be encrypted between a sending device and a receiving device using WEP or WPA, and a continuous stream of data may be sent back and forth between them.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and/or methods described herein may permit implementation of dual-antenna techniques and alternating encryption protocols to transmit data over a wireless network. Systems and/or methods described herein may apply an algorithm that can use each antenna independently to transmit alternating blocks/packets of data simultaneously using different channels. The channels may be spatially far enough apart so that that they do not overlap. Also, different encryption protocols may be used for each antenna so that the data is diversely routed between sending and receiving devices.

Figure 1:
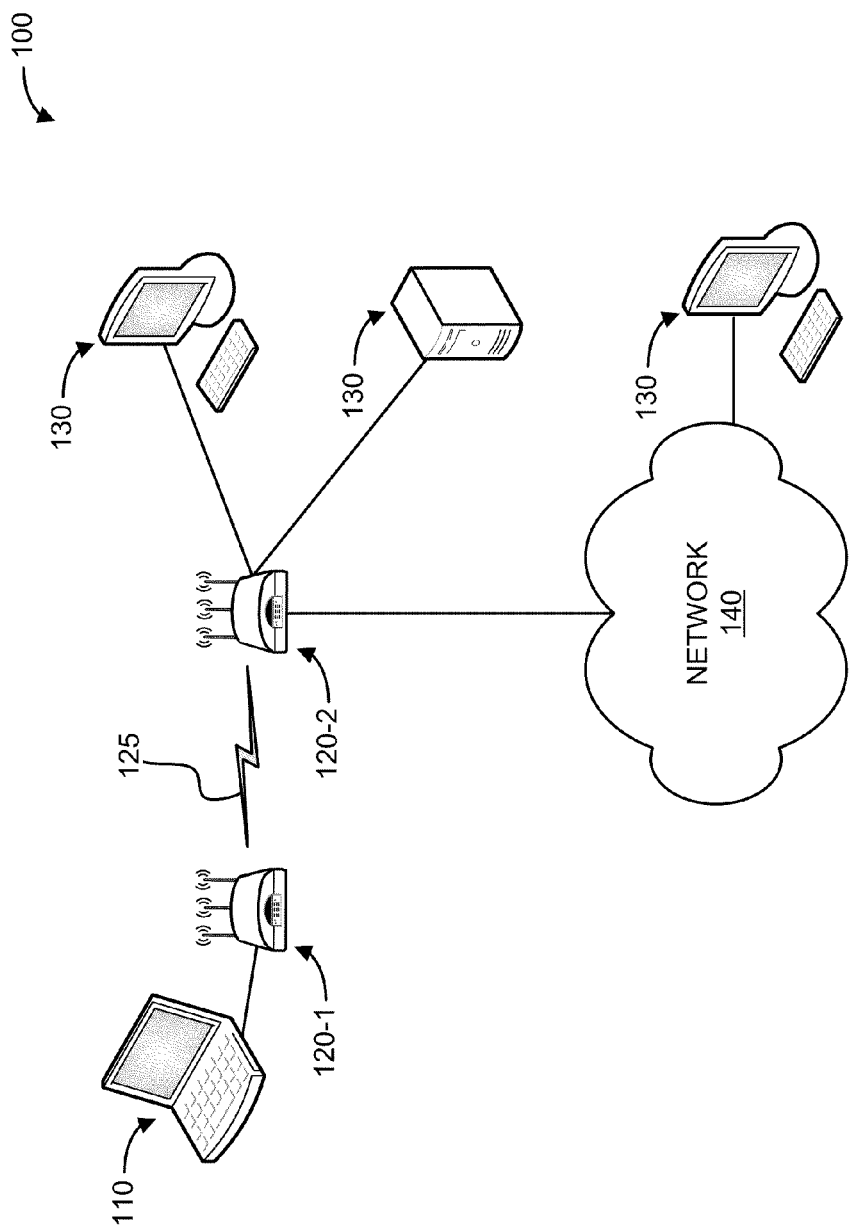
FIG. 1 depicts an exemplary network in which systems and methods described herein may be implemented.

FIG. 1 depicts an exemplary network 100 in which concepts described herein may be implemented. As illustrated, network 100 may include a client device 110 in communication with an access point pair 120-1 and 120-2 (collectively and/or generically referred to herein as access point 120), and one or more other devices 130. Access point pair 120-1 and 120-2 may form a wireless network 125. As shown in FIG. 1, other devices 130 may be connected to one or more access points 120 either directly, or through one or more networks, such as network 140.

Client device 110 may include a device capable of transmitting and receiving data (e.g., voice, text, images, and/or multimedia data) over an IP network. For example, client device 110 may include a personal computer, a personal digital assistant (PDA), a laptop or notebook computer, a wireless telephone, or another type of computation or communication device, a thread or process running on one of these devices, and/or an object executable by one of these devices.

Access point 120 may include any hardware device or combination of hardware and software, such as a wireless router, a wireless access point, a wireless adapter, a base station, etc., that uses multiple antennas to act as a communication hub for connecting client device 110 to one or more other devices 130 and/or network 140. In one implementation, access point 120 may conform to Institute of Electrical and Electronics Engineers (IEEE) 802.11n standards operating over the unregulated 2.4 and 5 GHz frequency spectrums. An access point pair (e.g., access points 120-1 and 120-2) may communicate over wireless network 125 according to implementations described herein. Each access point 120 may connect to client device 110, one or more other devices 130, and/or network 140 via wired and/or wireless connections. If desired, these connections may be encrypted for privacy, authentication, tamper-protection, etc.

In one exemplary implementation, access point 120 may include a stand-alone device. In another exemplary implementation, access point 120 may be implemented within another device. For example, access point 120 may be implemented within a router (e.g., a wireless router), a modem (e.g., a digital subscriber line (DSL) modem, a dialup modem, etc.), an optical network terminal (ONT), or another device. As another example, access point 120 may be implemented within a computer device or a mobile communications device, such as client device 110 and/or other device 130.

Other devices 130 may each include any type of device that is able to communicate via a network (such as network 140). For example, other device 130 may include any type of device that is capable of transmitting and receiving data (e.g., voice, text, images, and/or multimedia data) to/from a network. In an exemplary implementation, other device 130 may include a device similar to client device 110.

Network 140 may include a local area network (LAN), a wide area network (WAN), a metropolitan area network (MAN), an intranet, the Internet, a Public Land Mobile Network (PLMN), a telephone network, such as the Public Switched Telephone Network (PSTN) or a cellular telephone network (e.g., wireless Global System for Mobile Communications (GSM), wireless Code Division Multiple Access (CDMA), etc.), a VoIP network with mobile and/or fixed locations, a wireline network, or a combination of networks. In an exemplary implementation, network 140 may include a combination of networks and other components (e.g., switches, routers, etc.) for transmitting data to and from access point 120 and other device 130. Network 140 may also include components necessary to facilitate packet data traffic, including for example, one or more load balancers, gateways, and/or databases connected by a core infrastructure (not shown).

In operation, client device 110 may access wireless network 125 by selecting or otherwise identifying a Service Set Identifier (SSID) associated with network 125. Traffic across network 125 may be encrypted using any of several available network layer security protocols, such as the Wired Equivalent Privacy (WEP) or Wi-Fi Protected Access (WPA) protocols. Client device 110 can enter an encryption key or password prior to being granted access to network 100. Assuming that more than one of these protocols is employed, client device 110 may enter a separate encryption key or password for each protocol. In another implementation, client device 110 may use the same encryption key or password for each type of security protocol used in wireless network 125. According to systems and methods described herein, access point 120 may use parallel transmission of dually encrypted data on different channels to transmit data over wireless network 125.

Although FIG. 1 shows exemplary components of network 100, in other implementations, network 100 may contain fewer, additional, different, or differently arranged components than depicted in FIG. 1. For example, a firewall may be implemented to protect the network and act as a security gate to fend off unauthorized traffic. In still other implementations, one or more components of network 100 may perform one or more other tasks described as being performed by one or more other components of network 100.

Figure 2:
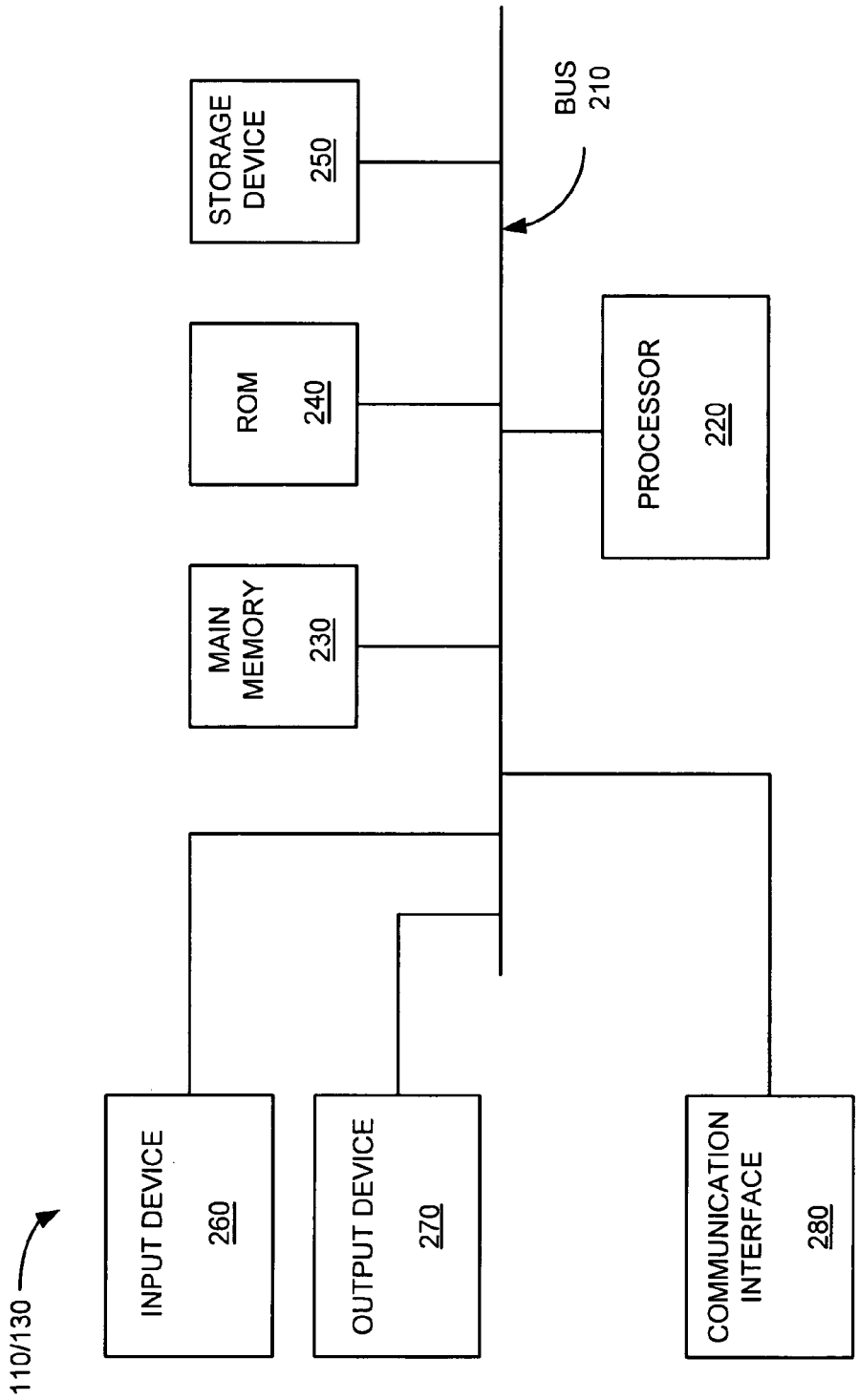
FIG. 2 is a diagram of exemplary components of the client device of FIG. 1.

FIG. 2 is a diagram of exemplary components of client device 110 in an implementation consistent with the systems and methods described herein. Other devices 130 may be similarly configured. Client device 110 may include a bus 210, a processor 220, a main memory 230, a ROM 240, a storage device 250, an input device 260, an output device 270, and a communication interface 280. Bus 210 may include one or more conductors that permit communication among the components of client device 110.

Processor 220 may include any type of processor or microprocessor that may interpret and execute instructions. Main memory 230 may include a RAM or another type of dynamic storage device that may store information and instructions for execution by processor 220. ROM 240 may include a ROM device or another type of static storage device that may store static information and instructions for use by processor 220. Storage device 250 may include a magnetic and/or optical recording medium and its corresponding drive.

Input device 260 may include one or more mechanisms that permit an operator to input information to client device 110, such as a keyboard, a mouse, a pen, voice recognition and/or biometric mechanisms, etc. Output device 270 may include one or more mechanisms that output information to the operator, including a display, a printer, a speaker, etc. Communication interface 280 may include any transceiver-like mechanism that enables client device 110 to communicate with other devices and/or systems. For example, communication interface 280 may include mechanisms for communicating with access point 120.

As will be described in detail below, client device 110 may perform certain operations described herein in response to processing 220 executing software instructions of an application contained in a computer-readable medium, such as main memory 230. The software instructions may be read into main memory 230 from another computer-readable medium or from another device via communication interface 280. The software instructions contained in memory 230 may cause processor 220 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 shows exemplary components of client device 110, in other implementations, client device 110 may contain fewer, additional, different, or differently arranged components than depicted in FIG. 2. For example, in other implementations, components and/or capabilities of access point 120 may be included in client device 110 and/or other devices 130. In still other implementations, one or more components of client device 110 may perform one or more other tasks described as being performed by one or more other components of client device 110.

Figure 3:
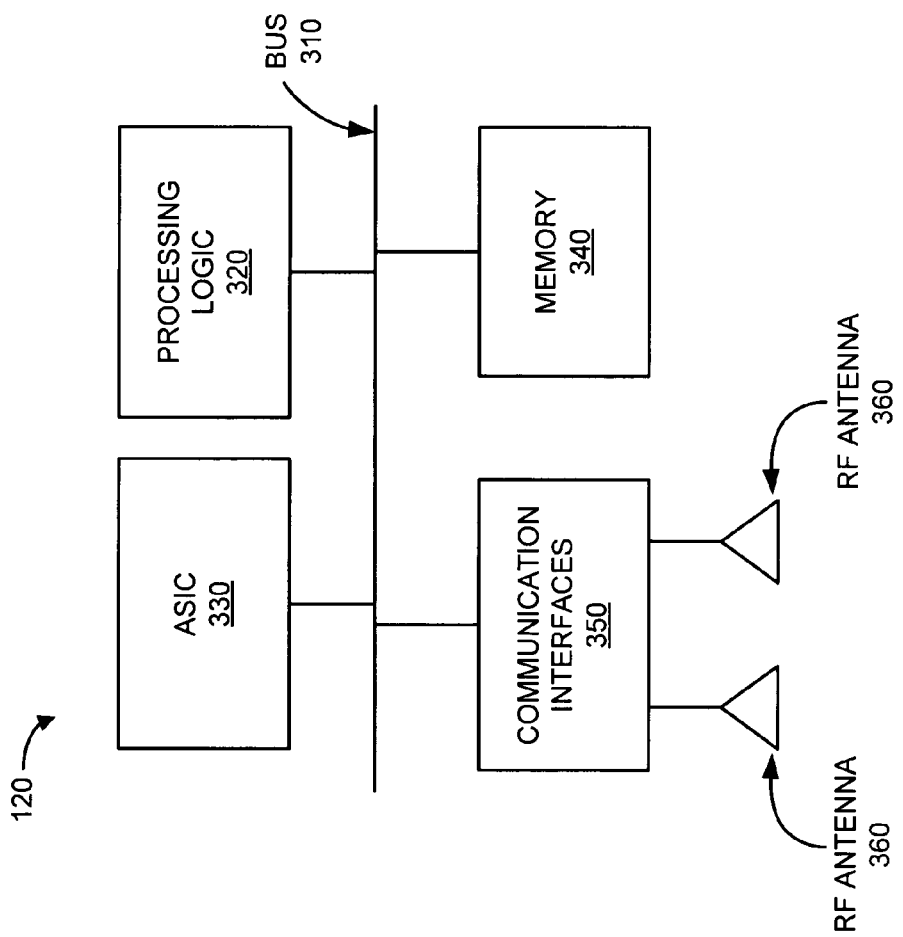
FIG. 3 is a diagram of exemplary components of the access point of FIG. 1.

FIG. 3 is an exemplary configuration of access point 120 of FIG. 1 in an implementation consistent with implementations described herein. In some implementations, client device 110 and/or other devices 130 may be similarly configured. As illustrated, access point 120 may include a bus 310, processing logic 320, an Application Specific Integrated Circuit (ASIC) 330, a memory 340, a group of communication interfaces 350, and two or more RF antennas 360. Bus 310 permits communication among the components of access point 120.

Processing logic 320 may include any type of processor or microprocessor that interprets and executes instructions. ASIC 330 may include one or more ASICs capable of performing network-related functions. More specifically, in one implementation, ASIC 330 may perform security and access point related functionality.

Memory 340 may include a random access memory (RAM) or another dynamic storage device that may store information and instructions for execution by processing logic 320; a read only memory (ROM) or another type of static storage device that may store static information and instructions for use by processing logic 320; and/or some other type of magnetic or optical recording medium and its corresponding drive.

Communication interfaces 350 may include any transceiver-like mechanisms that enable access point 120 to communicate with other devices and/or systems, such as another access point 120, client device 110, other devices 130, and/or devices associated with network 140. The transceiver may include components for transmitting and receiving packets. Communication interfaces 350 may connect to RF antennas 360 for transmission and/or reception of the RF signals. In an exemplary implementation, communication interfaces 350 may include a separate transceiver for each RF antenna 360. In another exemplary implementation, the transceivers of communications interfaces 350 may take the form of a transmitter and receiver, instead of being implemented as single component. Communication interfaces 350 may include, for example, a transmitter that may convert baseband signals from processing logic 320 to radio frequency (RF) signals and/or a receiver that may convert RF signals to baseband signals.

Each of RF antennas 360 may include an antenna to transmit and/or receive RF signals over the air. RF antenna 360 may, for example, receive RF signals from communication interfaces 350 and transmit them over the air, and receive RF signals over the air and provide them to communication interfaces 350. In one implementation, for example, communication interfaces 350 may communicate with a network (e.g., network 140) and/or devices (e.g., client device 110). While two RF antennas 360 are shown in FIG. 3, access point 360 may include more than two antennas in other implementations.

Although FIG. 3 shows exemplary components of access point 120, in other implementations, access point 120 may contain fewer, additional, different, or differently arranged components than depicted in FIG. 3. In still other implementations, one or more components of access point 120 may perform one or more other tasks described as being performed by one or more other components of access point 120.

As will be described in detail below, access point 120 may perform secure wireless network communications-related operations. Access point 120 may perform these and other operations in response to processing logic 320 executing software instructions contained in a computer-readable medium, such as memory 340. A computer-readable medium may be defined as a physical or logical memory device.

The software instructions may be read into memory 340 from another computer-readable medium or from another device via a communication interface 350. The software instructions contained in memory 340 may cause processing logic 320 to perform processes described herein. Alternatively, hardwired circuitry may be used in place of or in combination with software instructions to implement processes described herein. Thus, systems and methods described herein are not limited to any specific combination of hardware circuitry and software.

Figure 4:
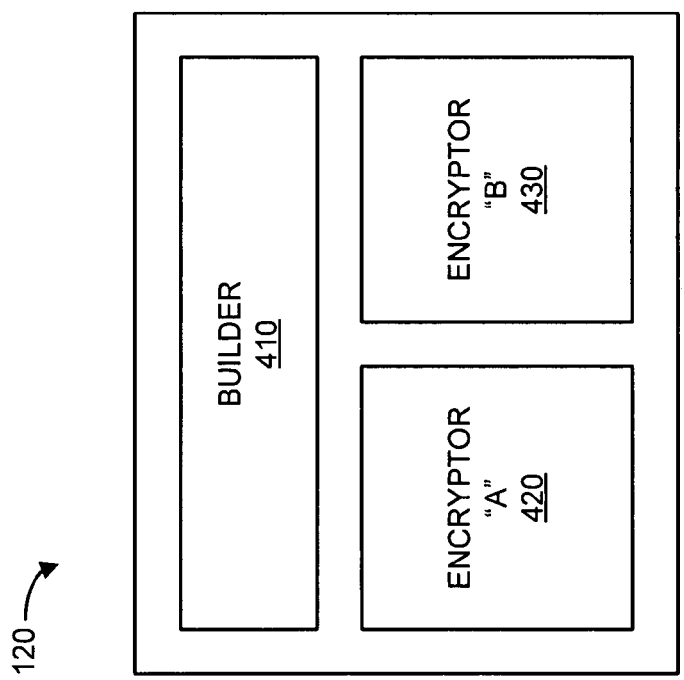
FIG. 4 provides a block diagram of exemplary functional components of the access point of FIG. 1.

FIG. 4 is a block diagram of exemplary functional components of access point 120. As shown in FIG. 4, access point 120 may include a builder 410, an encryptor "A" 420, and an encryptor "B" 430.

Builder 410 may assemble data received from a sending device into transmission control protocol/internet protocol (TCP/IP) packets or builder 410 may simply receive an existing TCP/IP data stream. Access point 120 may receive data from external devices in any format. Builder 410 may encapsulate the data into a secure TCP/IP format and remove the encapsulation once the data has been transferred over a wireless connection and is ready to pass to the external devices. Builder 410 may divide a TCP/IP data stream into portions (referred to herein as sets or "encrypt blocks"), such as fixed-size sets, that can be distributed to encryptor "A" 420 or encryptor "B" 430. In one implementation, builder 410 may assign encrypt blocks to encryptor "A" 420 or encryptor "B" 430 in alternating sequence. Builder 410 may also function on a receiving end of a wireless network connection to re-order TCP/IP packets and restore data to the original format in which the data was sent for transmission toward the intended recipient.

Encryptor "A" 420 and encryptor "B" 430 may use encryption protocols to encrypt/decrypt the sets. Encryptor "A" 420 and encryptor "B" 430 may use different encryption protocols. For example, in one implementation encryptor "A" 420 may use WEP encryption/decryption, while encryptor "B" 430 may use WPA encryption/decryption. Encryptor "A" 420 and encryptor "B" 430 may operate substantially in parallel to perform encryption/decryption functions on the sets. Each of encryptor "A" 420 and encryptor "B" 430 may transmit and receive sets from a dedicated antenna (such as one of RF antennas 360). When access point 120 functions as a sender, encryptor "A" 420 and encryptor "B" 430 may receive sets from builder 410 to be encrypted. When access point 120 functions as a receiver, encryptor "A" 420 and encryptor "B" 430 may forward decrypted sets to builder 410.

Figure 5:
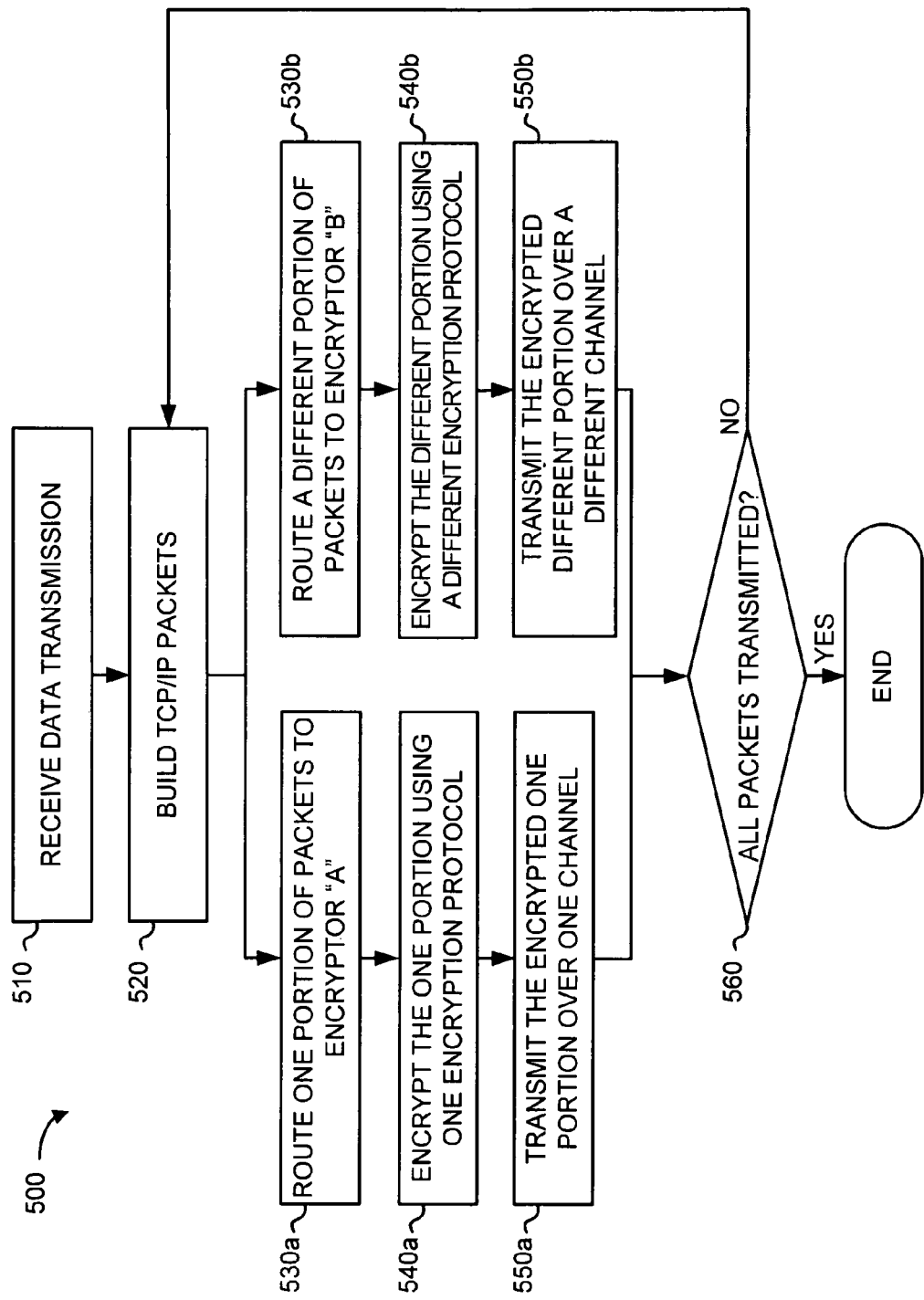
FIG. 5 provides a flow chart of an exemplary process that may be performed by a device in sending data over a wireless network.

FIG. 5 provides a flow chart of exemplary process 500 that may be performed when sending data over a wireless network. In an exemplary implementation, process 500 may be performed by an access point (such as access point 120-1 to send data over wireless network 125 to access point 120-2). A setup phase for the wireless network may include the acquisition of security keys needed for WEP and/or WPA encryption. The acquisition of security keys may typically be accomplished via user input upon powering up and configuring, for example, client device 110 and/or access point 120-1. In one implementation, as an added level of security, the wireless network could optionally be configured to use separate keys for WEP and WPA, with a default of using the same key for each.

As shown in FIG. 5, process 500 may begin with the receipt of data intended for transmission over the wireless network (block 510). For example, a user of client device 110 may seek to send a data file to one of other devices 130. The data file may be transmitted from client device 110 on a path toward the other device until the data file reaches access point 120-1. The data file from client 110 device may be transmitted in any manner up to access point 120-1. Generally, transmission on external devices and links (e.g., http, UDP, TCP/IP, etc.) leading up to an access point 120 of wireless network 125 may not be affected by implementations of the systems and methods described herein.

TCP/IP packets may be built (block 520). For example, access point 120-1 may assemble the data file from client device 110 into TCP/IP packets for transmission over wireless network 125. TCP/IP may be used as the implemented mode between access points, such as access points 120-1 and 120-2. The use of TCP/IP can take advantage of the fact that TCP/IP has become a standard for both wired and wireless Ethernet traffic, and that TCP/IP can accomplish packet reordering. Thus, for example, even if client device 110 were sending/receiving UDP traffic, the UDP traffic could be encapsulated in TCP/IP packets to traverse a link over wireless network 125. In another implementation, access point 120-1 may use a protocol other than TCP/IP.

Different sets of the TCP/IP packets may be routed to each of the encryptors for parallel processing. One set of the packets may be routed to encryptor "A" (blocks 530*a*); while a different set of the packets may be routed to encryptor "B" (block 530*b*). For example, access point 120 may divide the TCP/IP data stream into sets (or "encrypt blocks"). The sets may be configured to any particular size to accommodate parallel data transmission. In one implementation, the sets may be a fixed size. For example, an encrypt block size may be fixed at 50 packets. In another implementation, the set size may be varied on a pre-determined or random basis. The access point 120 may begin passing the "data" (which is now in TCP/IP encrypt blocks) to each of the two encryptors, alternating, for example, between encryptor "A" 420 and encryptor "B" 430. Each of encryptor "A" 420 and encryptor "B" 430 may be logically associated with its own transmitting circuitry and dedicated antenna (such as one or RF antennas 360).

The different sets of the packets may be encrypted using different encryption protocols. The one set may be encrypted using one encryption protocol (block 540*a*); while the different set may be encrypted using a different encryption protocol (block 540*b*). For example, one encryptor (e.g., encryptor "A" 420) of access point 120 may use WEP encryption, while the other encryptor (e.g., encryptor "B" 430) of access point 120 may use WPA encryption. Each encryptor may use, for example, the encryption keys that were defined by a user (e.g., the user of client device 110) in the setup phase.

The encrypted sets of the packets may be transmitted over a dedicated antenna. The encrypted one set may be transmitted over one channel (block 550*a*); while the encrypted different set may be transmitted over a different channel (block 550*b*). For example, encryptor "A" 420 and encryptor "B" of access point 120 may each transmit their respective sets over a separate channel from a separate antenna (e.g., one of RF antennas 360). An algorithm can determine the applicable channel to use (e.g., channel "x" for encryptor "A" and channel "y" for encryptor "B"), such that the selected channels for each encryptor are spatially far enough apart that they do not overlap. That is, the selected channels may be spatially separated so that the first channel and the second channel do not substantially interfere with each other. In one implementation, a first encrypted set can be transmitted as a WEP or WPA encrypted block on channel "x." A second encrypted set can be encrypted using the other encryption (e.g., WPA or WEP) and transmitted on channel "y." Thus, data can be transmitted in parallel, on two different channels, using two different encryption techniques, on two different sets of data.

It may be determined if all of the packets have been transmitted (block 560). For example, access point 120 may determine if all the data from a particular data file (e.g., a file from client device 110) has been transmitted. If all of the packets have not been transmitted (block 560-NO), then process 500 may continue building more TCP/IP packets (block 520). The process may then proceed as described above. In one implementation, to strengthen the algorithm even further, the next consecutive set of encryption blocks can be routed to the other encryption process for different encryption and transmission. For example, if encryptor "A" used WPA encryption for the first set of packets, encryptor "A" may use WEP encryption for the next set of packets. Conversely, if encryptor "B" used WEP encryption for the first set of packets, encryptor "B" may use WPA encryption for the next set of packets. In another implementation, access point 120 may randomly select an encryption protocol to be used by the encryptors (e.g., encryptor "A" and encryptor "B").

Figure 6:
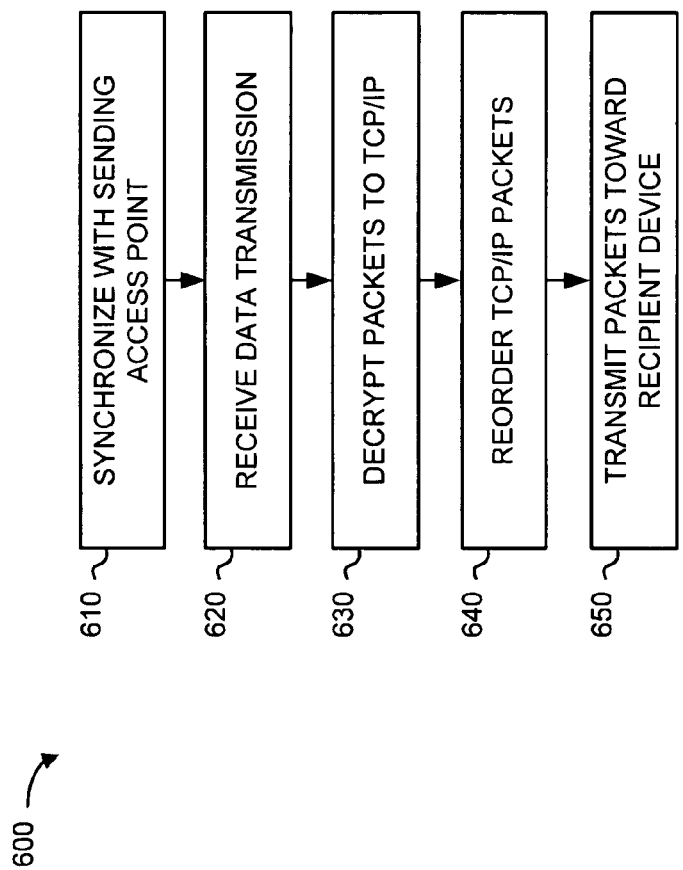
FIG. 6 provides a flow chart of an exemplary process that may be performed by a device in receiving data over a wireless network.

FIG. 6 provides a flow chart of exemplary process 600 that may be performed when receiving data over a wireless data network. In an exemplary implementation, process 600 may be performed by an access point (such as access point 120-2 to receive data over wireless network 125 from access point 120-1).

As shown in FIG. 6, process 600 may begin by synchronizing with a sending access point (block 610). For example, access point 120-2 may synchronize with access point 120-1. The synchronization may occur, for example, during a setup phase for the wireless network. The synchronization may include an indication of the algorithm and/or sequencing scheme to be used in transmitting data over the wireless network.

A data transmission may be received (block 620) and packets decrypted to TCP/IP (block 620). For example, access point 120-2 may receive data sets from access point 120-1. The data sets may be received in parallel, on two different channels, using two different encryption techniques, on two different sets of data. The access point 120-2 uses the same algorithm as the sending device (e.g., access point 120-1), and can therefore anticipate the encryption sequencing scheme (e.g., WEP on one channel and WPA on another channel) from the sending device. Upon receiving each set (or encrypt block), access point 120-2 may reverse the encryption process used by the sending device. Thus, access point 120-2 (using encryptor "A" 420 and encryptor "B" 430) may decrypt the encryption block and send the resulting TCP/IP packets to the builder (e.g., builder 410) of access point 120-2.

The TCP/IP packets may be reordered (block 640). For example, access point 120-2 (using builder 410) may receive each decrypted TCP/IP packet and reorder the packet as necessary.

The packets may be transmitted toward the other device (block 650). For example, access point 120 may transmit the ordered packet stream in the original format of the sending device toward the intended other device.

Figure 7:
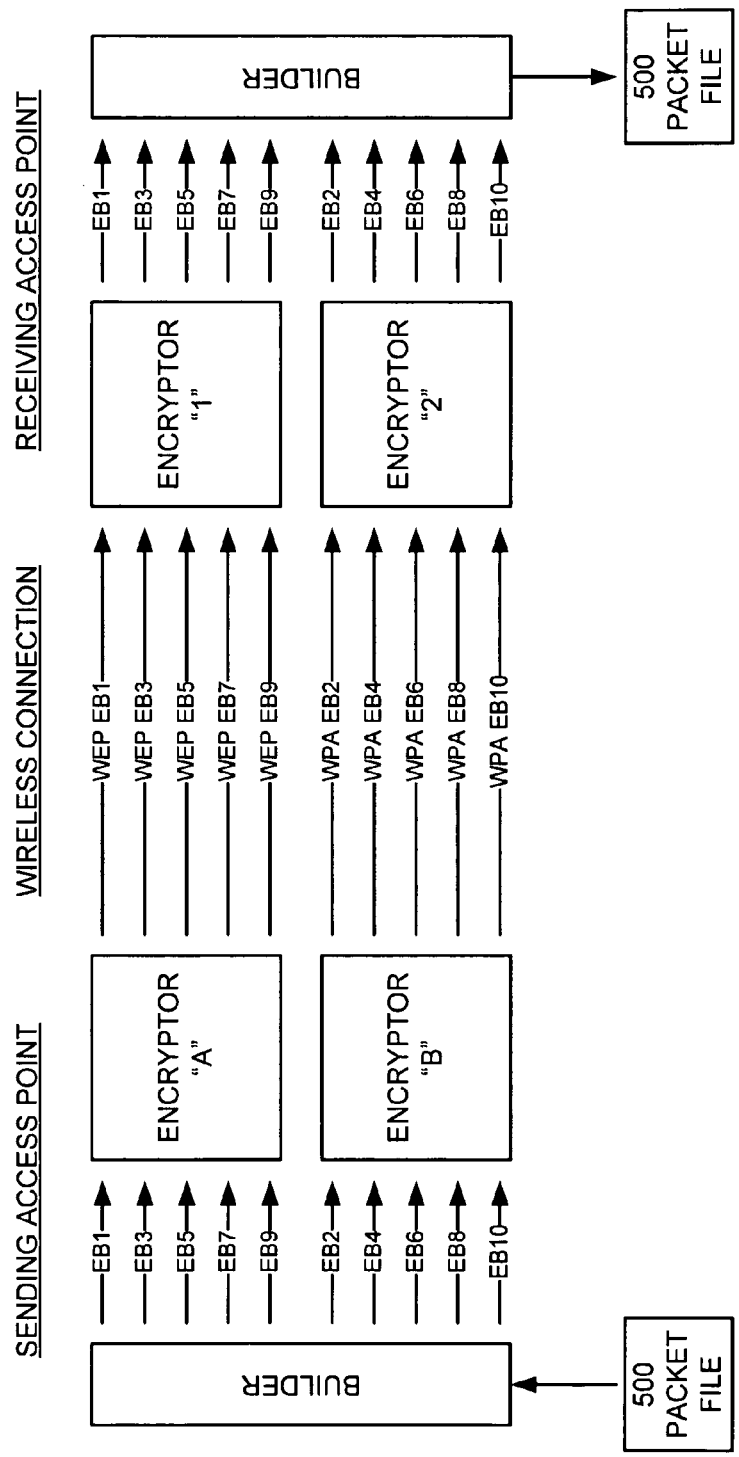
FIG. 7 depicts a diagram of a data flow for an exemplary implementation.

FIG. 7 depicts a diagram of a data flow for an exemplary implementation of the system and/or methods described herein. In FIG. 7, assume a user wants to send a file with a size of 500 TCP/IP packets over a secure wireless link. The user's computer may be connected to a secure wireless access point via a standard category 5 (CAT 5) Ethernet cable. Thus, data may be sent from the user's computer to the access point as if the access point were a typical LAN device (e.g., a switch, a router, a cable modem, etc.).

As the packets are received by the sending access point, the data can be routed to a builder, within the sending access point, that segments the 500 packets into ten (10) encrypt blocks (EBs) of 50 packets each. The builder can begin sending each consecutive block to one of two encrypt processes (encryptor "A" and encryptor "B") in an alternating fashion. Thus, the first encrypt block (EB1) is sent to encryptor "A," the second encrypt block (EB2) is sent to encryptor "B," the third encrypt block (EB3) is sent to encryptor "A," the fourth encrypt block (EB4) is sent to encryptor "B" and so forth, until the end of the data sequence with EB10 being sent to encryptor "B".

Each encryptor from the sending access point (encryptor "A" and encryptor "B") may then encrypt the TCP/IP packets using an assigned protocol, and may send out the data over a wireless connection on an assigned wireless channel. For this example, assume that encryptor "A" of the sending access point is using WEP and channel 2 and that encryptor "B" is using WPA and channel 9. Thus, encryptor "A" may encrypt EB1, EB3, EB5, EB7 and EB9 using WEP and send each block (e.g., WEP EB1) using channel 2. In parallel with encryptor "A," encryptor "B" will encrypt EB2, EB4, EB6, EB8 and EB10 using WPA and send each block (e.g., WPA EB2) using channel 9. Channels 2 and 9 are presumed to be spatially far enough apart that they do not interfere with each other.

The receiving access point is synchronized with the sending access point and is expecting to receive WEP encrypted packets on channel 2 and WPA packets on channel 9. Therefore, encryptor "1" can decrypt WEP EB1, WEP EB3, WEP EB5, WEP EB7 and WEP EB9 and encryptor "2" can decrypt WPA EB2, WPA EB4, WPA EB6, WPA EB8 and WPA EB10. Each of encryptor "1" and encryptor "2" can feed the decrypted output to the builder for the receiving access point. The builder can take the decrypted TCP/IP packets and reorder the packets (if necessary) before handing them off to the receiving device (e.g., other device 130) back in the native form that was originally transmitted. Thus, if any encapsulation was done, the 500 packet file can be returned to the original format before it is sent from the receiving access point toward the destination Ethernet port/device.

The data transmission shown in the example of FIG. 7 effectively takes the original data, splits the data into sets (using alternating sets), applies different encryption techniques to each set, and then sends them on different channels to the receiving end. Thus, if an unintended party were monitoring/listening to the data transmission, the unintended party may only be scanning for one channel and one protocol at a time. So even if the unintended party were successful in accessing the wireless traffic, the unintended party would likely decipher only a partial file with large blocks of missing data.

Methods and/or systems described herein may provide for parallel transmission of dually encrypted data on different channels of a wireless network. Wireless transmission may be conducted between a sending access point and a receiving access point. Each of the sending access point and the receiving access point may be separate devices or may be devices associated with another device, such as a router or a personal computer. The sending access point may divide a TCP/IP data stream into sets and encrypt some of the sets using a first encryption protocol while encrypting the remainder of the sets using a second encryption protocol. The sending access point may transmit each of the encrypted sets over a wireless network using a separate dedicated antenna. The receiving access point can receive the sets and can decrypt the sets using the appropriate decryption protocol. The receiving access point can then re-assemble the TCP/IP data stream.

The foregoing description provides illustration and description, but is not intended to be exhaustive or to limit the embodiments to the precise form disclosed. Modifications and variations are possible in light of the above teachings or may be acquired from practice of systems and methods disclosed herein.

For example, while implementations herein have been described primarily in the context of TCP/IP, WEP and WPA, other protocols and/or encryption techniques may be used. As another example, instead of alternating the encrypt block sequence to each encryptor, a round-robin assignment process, random process or other assignment process may be used. As another example, the process may be modified to include channel hopping of the two different paths of transmission. Thus, a first set of encrypt block may be sent using channels 1 and 11, followed by another set using channels 2 and 10, and another set using channels 3 and 9, etc.

Also, while series of blocks and lines have been described with regard to FIGS. 5 and 6, the order of the blocks may differ in other implementations. Further, non-dependent blocks may be performed in parallel.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain implementations described herein may be implemented as "logic" that performs one or more functions. This logic may include hardware, such as a processor, microprocessor, an application specific integrated circuit or a field programmable gate array; or a combination of hardware and software.

It should be emphasized that the term "comprises" and/or "comprising" when used in this specification is taken to specify the presence of stated features, integers, steps, or components, but does not preclude the presence or addition of one or more other features, integers, steps, components, or groups thereof.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

What is claimed is:

1. A method, comprising:
    dividing, by a first device, a first portion of a transmission control protocol/internet protocol (TCP/IP) data stream into a first set of packets and a second set of packets;
    encrypting, by the first device, the first set of packets using a first encryption protocol;
    encrypting, by the first device, the second set of packets using a second encryption protocol that differs from the first encryption protocol;
    transmitting, by the first device and via a first channel over a wireless network, the encrypted first set of packets to a second device, that differs from the first device;
    transmitting, by the first device and via a second channel over the wireless network, the encrypted second set of packets to the second device;
    dividing, by the first device, a second portion of the TCP/IP data stream into a third set of packets and a fourth set of packets;
    encrypting, by the first device, the third set of packets using the second encryption protocol and the fourth set of packets using the first encryption protocol;
    transmitting, by the first device and via the first channel over the wireless network, the encrypted third set of packets; and
    transmitting, by the first device and via the second channel, the encrypted fourth set of packets.

2. The method of claim 1, further comprising:
    receiving, by the second device and via the first channel over the wireless network, the encrypted first set of packets;
    receiving, by the second device and via the second channel over the wireless network, the encrypted second set of packets;
    decrypting by the second device, the encrypted first set of packets based on the first encryption protocol; and
    decrypting by the second device, the encrypted second set of packets based on the second encryption protocol.

3. The method of claim 2, further comprising:
    reforming, using the decrypted first set of packets and the decrypted second set of packets, the first portion of the TCP/IP data stream; and
    sending the reformed first portion of the TCP/IP data stream toward another device.

4. The method of claim 1, where the first encryption protocol includes Wired Equivalent Privacy (WEP), and
    where the second encryption protocol includes Wi-Fi Protected Access (WPA).

5. The method of claim 1, where the first channel and the second channel are spatially separated to minimize interference between the first channel and the second channel.

6. The method of claim 1, where the first set of packets and the second set of packets are encrypted concurrently.

7. The method of claim 1, where the encrypted first set of packets and the encrypted second set of packets are transmitted concurrently.

8. The method of claim 1, further comprising:
    receiving a data transmission in a non-TCP/IP format; and
    converting the data transmission into the TCP/IP data stream.

9. The method of claim 1, where dividing the first portion of the TCP/IP data stream into the first set of packets and the second set of packets includes:
    alternatively assigning packets in the first portion of the TCP/IP data stream to the first set of packets or the second set of packets.

10. The method of claim 1, where each of the first set of packets and the second set of packets includes an equal quantity of packets.

11. A device, comprising:
    one or more memories; and
    one or more processors, connected to the one or more memories, to:

divide a first portion of a transmission control protocol/ internet protocol (TCP/IP) data stream into a first set of packets and a second set of packets;

encrypt the first set of packets using a first encryption protocol;

encrypt the second set of packets using a second encryption protocol that differs from the first encryption protocol;

transmit, via a first channel over a wireless network, the encrypted first set of packets to a second device, that differs from the first device;

transmit, via a second channel over the wireless network, the encrypted second set of packets to the second device;

divide a second portion of the TCP/IP data stream into a third set of packets and a fourth set of packets;

encrypt the third set of packets using the second encryption protocol and the fourth set of packets using the first encryption protocol;

transmit, via the first channel over the wireless network, the encrypted third set of packets; and transmit, via the second channel, the encrypted fourth set of packets.

12. The device of claim 11, where the first encryption protocol includes Wired Equivalent Privacy (WEP), and
where the second encryption protocol includes Wi-Fi Protected Access (WPA).

13. The device of claim 11, where the first channel and the second channel are spatially separated to minimize interference between the first channel and the second channel.

14. The device of claim 11, where the first set of packets and the second set of packets are encrypted concurrently.

15. The device of claim 11, where the encrypted first set of packets and the encrypted second set of packets are transmitted concurrently.

16. The device of claim 11, where the one or more processors are further to:
receive a data transmission in a non-TCP/IP format; and
convert the data transmission into the TCP/IP data stream.

17. The device of claim 11, where the one or more processors, when dividing the first portion of the TCP/IP data stream into the first set of packets and the second set of packets, are further to:
alternatively assign packets in the first portion of the TCP/IP data stream to the first set of packets or the second set of packets.

18. The device of claim 11, where each of the first set of packets and the second set of packets includes an equal quantity of packets.

19. A non-transitory computer readable medium storing instructions, the instructions comprising:
one or more instructions that, when executed by one or more processors of a first device, cause the one or more processors to:
divide a first portion of a transmission control protocol/ internet protocol (TCP/IP) data stream into a first set of packets and a second set of packets;
encrypt the first set of packets using a first encryption protocol;
encrypt the second set of packets using a second encryption protocol that differs from the first encryption protocol;
transmit, via a first channel over a wireless network, the encrypted first set of packets to a second device, that differs from the first device;
transmit, via a second channel over the wireless network, the encrypted second set of packets to the second device;
divide a second portion of the TCP/IP data stream into a third set of packets and a fourth set of packets;
encrypt the third set of packets using the second encryption protocol and the fourth set of packets using the first encryption protocol;
transmit, via the first channel over the wireless network, the encrypted third set of packets; and
transmit, via the second channel, the encrypted fourth set of packets.

20. The non-transitory computer readable medium of claim 19, where the first encryption protocol includes Wired Equivalent Privacy (WEP), and
where the second encryption protocol includes Wi-Fi Protected Access (WPA).

21. The non-transitory computer readable medium of claim 19, where the first channel and the second channel are spatially separated to minimize interference between the first channel and the second channel.

22. The non-transitory computer readable medium of claim 19, where the first set of packets and the second set of packets are encrypted concurrently.

23. The non-transitory computer readable medium of claim 19, where the one or more instructions, when executed by the one or more processors, further cause the one or more processors to:
receive a data transmission in a non-TCP/IP format; and
convert the data transmission into the TCP/IP data stream.

24. The non-transitory computer readable medium of claim 19, where the one or more instructions, that cause the one or more processors to divide the first portion of the TCP/IP data stream into the first set of packets and the second set of packets, further cause the one or more processors to:
alternatively assign packets in the first portion of the TCP/IP data stream to the first set of packets or the second set of packets.

* * * * *